US012073065B2

(12) United States Patent
Gyldenege et al.

(10) Patent No.: US 12,073,065 B2
(45) Date of Patent: *Aug. 27, 2024

(54) DATA PREPARATION USER INTERFACE WITH COORDINATED PIVOTS

(71) Applicant: Tableau Software, Inc., Seattle, WA (US)

(72) Inventors: Arthur Gyldenege, Seattle, WA (US); Anushka Anand, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/307,402

(22) Filed: May 4, 2021

(65) Prior Publication Data

US 2021/0255760 A1     Aug. 19, 2021

Related U.S. Application Data

(63) Continuation of application No. 16/221,413, filed on Dec. 14, 2018, now Pat. No. 10,996,835.

(51) Int. Cl.
*G06F 3/04845* (2022.01)
*G06F 3/0482* (2013.01)
*G06F 40/177* (2020.01)

(52) U.S. Cl.
CPC ........ *G06F 3/04845* (2013.01); *G06F 3/0482* (2013.01); *G06F 40/177* (2020.01); *G06F 2203/04803* (2013.01)

(58) Field of Classification Search
None
See application file for complete search history.

(56) References Cited

U.S. PATENT DOCUMENTS

| | | | |
|---|---|---|---|
| 5,511,186 | A | 4/1996 | Carhart et al. |
| 6,212,524 | B1 | 4/2001 | Weissman et al. |
| 6,385,604 | B1 | 5/2002 | Bakalash et al. |
| 6,492,989 | B1 | 12/2002 | Wilkinson |
| 6,807,539 | B2 | 10/2004 | Miller et al. |

(Continued)

OTHER PUBLICATIONS

Baldwin, Cody, "Learn Pivot Tables in 6 Minutes", Oct. 19, 2015, YouTube, <URL: https://www.youtube.com/watch?v=qu-AKOHv0b4>, retrieved on Apr. 5, 2024 (Year: 2015).*
Ganapavurapu, "Designing and Implementing a Data Warehouse Using Dimensional Modling," Thesis Dec. 7, 2014, XP055513055, retrieved from Internet: UEL:https://digitalepository.unm.edu/cgi/viewcontent.cgi?article= 1091&context-ece_etds, 87 pgs.

(Continued)

*Primary Examiner* — Christopher J Fibbi
(74) *Attorney, Agent, or Firm* — Morgan, Lewis & Bockius LLP

(57) ABSTRACT

A computer user interface displays a two-dimensional grid of data values. A user selects a first set of two or more columns of data values from the grid, and the computer performs a first pivot on the first set of two or more columns to form a modified grid having a plurality of new rows and a first set of two or more new columns. The user selects a second set of two or more columns of data values from the grid. The second set is distinct from the first set. The computer performs a second pivot on the second set of two or more columns to form a second new column added to the modified grid. Each data value from the second set of two or more columns is added to the second new column in a respective row of the new rows. The computer redisplays the modified grid.

20 Claims, 17 Drawing Sheets

(56) References Cited

U.S. PATENT DOCUMENTS

| | | | |
|---|---|---|---|
| 7,023,453 B2 | 4/2006 | Wilkinson | |
| 7,143,339 B2 | 11/2006 | Weinberg et al. | |
| 7,176,924 B2 | 2/2007 | Wilkinson | |
| 7,290,007 B2 | 10/2007 | Farber et al. | |
| 7,337,163 B1* | 2/2008 | Srinivasan | G06F 16/2453 |
| | | | 707/999.102 |
| 7,426,520 B2 | 9/2008 | Gorelik et al. | |
| 7,800,613 B2 | 9/2010 | Hanrahan et al. | |
| 8,082,243 B2 | 12/2011 | Gorelik et al. | |
| 8,442,999 B2 | 5/2013 | Gorelik et al. | |
| 8,874,613 B2 | 10/2014 | Gorelik et al. | |
| 9,336,253 B2 | 5/2016 | Gorelik et al. | |
| 9,411,797 B2 | 8/2016 | Campbell et al. | |
| 9,430,469 B2* | 8/2016 | Lam | G06F 40/18 |
| 9,563,674 B2 | 2/2017 | Hou et al. | |
| 9,613,086 B1 | 4/2017 | Sherman | |
| 9,710,527 B1 | 7/2017 | Sherman | |
| 9,779,150 B1 | 10/2017 | Sherman et al. | |
| 2001/0054034 A1 | 12/2001 | Arning et al. | |
| 2003/0023608 A1 | 1/2003 | Egilsson et al. | |
| 2004/0103088 A1 | 5/2004 | Cragun et al. | |
| 2004/0122844 A1 | 6/2004 | Malloy et al. | |
| 2004/0139061 A1 | 7/2004 | Colosi et al. | |
| 2004/0243593 A1 | 12/2004 | Stolte et al. | |
| 2005/0038767 A1 | 2/2005 | Verschell et al. | |
| 2005/0060300 A1 | 3/2005 | Stolte et al. | |
| 2005/0182703 A1 | 8/2005 | D'hers et al. | |
| 2006/0010143 A1 | 1/2006 | Netz et al. | |
| 2006/0167924 A1* | 7/2006 | Bradlee | G06F 16/2425 |
| | | | 707/999.102 |
| 2006/0173813 A1 | 8/2006 | Zorola | |
| 2006/0206512 A1 | 9/2006 | Hanrahan et al. | |
| 2006/0294081 A1 | 12/2006 | Dettinger et al. | |
| 2007/0006139 A1 | 1/2007 | Rubin | |
| 2007/0156734 A1 | 7/2007 | Dipper et al. | |
| 2008/0016026 A1 | 1/2008 | Farber et al. | |
| 2009/0006370 A1 | 1/2009 | Li et al. | |
| 2009/0319548 A1 | 12/2009 | Brown et al. | |
| 2010/0005054 A1 | 1/2010 | Smith et al. | |
| 2010/0005114 A1 | 1/2010 | Dipper | |
| 2010/0077340 A1 | 3/2010 | French et al. | |
| 2011/0131250 A1 | 6/2011 | Stolte et al. | |
| 2012/0116850 A1 | 5/2012 | Abe et al. | |
| 2012/0117453 A1 | 5/2012 | Mackinlay et al. | |
| 2013/0080584 A1 | 3/2013 | Benson | |
| 2013/0145244 A1* | 6/2013 | Rothschiller | G06F 40/18 |
| | | | 715/212 |
| 2013/0191418 A1 | 7/2013 | Martin, Jr. et al. | |
| 2014/0019842 A1* | 1/2014 | Montagna | G06F 40/18 |
| | | | 715/227 |
| 2014/0189553 A1 | 7/2014 | Bleizeffer et al. | |
| 2015/0278371 A1 | 10/2015 | Anand et al. | |
| 2016/0335303 A1* | 11/2016 | Madhalam | G06F 16/2455 |
| 2017/0124094 A1* | 5/2017 | Langseth | G06F 16/2423 |
| 2018/0239748 A1* | 8/2018 | Zhang | G06F 3/0482 |
| 2018/0349338 A1* | 12/2018 | Cheung | G06F 40/18 |
| 2020/0073876 A1 | 3/2020 | Lopez et al. | |

OTHER PUBLICATIONS

Gyldenege, Preinterview First Office Action, U.S. Appl. No. 16/221,413, Jun. 11, 2020, 4 pgs.

Gyldenege, First Action Interview Office Action, U.S. Appl. No. 16/221,413, Jul. 27, 2020, 7 pgs.

Gyldenege, Notice of Allowance, U.S. Appl. No. 16/221,413, Jan. 12, 2021, 12 pgs.

Mansmann, "Extending the OLAP Technology to Handle Non-Conventional and Complex Data," Sep. 29, 2008, XP055513939, retrieve from URL/https://kops.uni-konstanz.de/hadle/123456789/5891, 1 pg.

Morton, Office Action, U.S. Appl. No. 14/054,803, Sep. 11, 2015, 22 pgs.

Morton, Final Office Action, U.S. Appl. No. 14/054,803, May 11, 2016, 22 pgs.

Morton, Notice of Allowance, U.S. Appl. No. 14/054,803, Mar. 1, 2017, 23 pgs.

Morton, Preinterview 1st Office Action, U.S. Appl. No. 15/497,130, Sep. 18, 2019, 6 pgs.

Morton, First Action Interview Office Action, U.S. Appl. No. 15/497,130, Feb. 19, 2020, 26 pgs.

Morton, Final Office Action, U.S. Appl. No. 15/497,130, Aug. 12, 2020, 19 pgs.

Morton, Office Action, U.S. Appl. No. 15/497,130, Jan. 8, 2021, 20 pgs.

Morton, Office Action, U.S. Appl. No. 15/497,130, Jun. 15, 2021, 35 pgs.

Morton, Notice of Allowance, U.S. Appl. No. 15/497,130, Feb. 11, 2022, 11 pgs.

Song et al., "SAMSTAR," Data Warehousing and OLAP, ACM, 2 Penn Plaza, Suite 701, New York, NY, Nov. 9, 2007, XP058133701, pp. 9 to 16, 8 pgs.

Tableau Software, Inc., International Search Report and Written Opinion, PCTUS2019056491, Jan. 2, 2020, 11 pgs.

Tableau Software, Inc., International Search Report and Written Opinion, PCTUS2018/044878, Oct. 22, 2018, 15 pgs.

Tableau Software, Inc., International Preliminary Report on Patentability, PCTUS2018/044878, Apr. 14, 2020, 12 pgs.

Talbot, Office Action, U.S. Appl. No. 14/801,750, May 7, 2018, 60 pgs.

Talbot, Final Office Action, U.S. Appl. No. 14/801,750, Nov. 28, 2018, 63 pgs.

Talbot, Office Action, U.S. Appl. No. 14/801,750, Jun. 24, 2019, 55 pgs.

Talbot, Notice of Allowance, U.S. Appl. No. 14/801,750, Dec. 22, 2021, 9 pgs.

Talbot, Preinterview First Office Action, U.S. Appl. No. 15/911,026, Jun. 9, 2020, 6 pgs.

Talbot, First Action Interview Office Action, U.S. Appl. No. 15/911,026, Jul. 22, 2020, 6 pgs.

Talbot, Final Office Action, U.S. Appl. No. 15/911,026, Dec. 16, 2020, 28 pgs.

Talbot, Notice of Allowance, U.S. Appl. No. 15/911,026, Nov. 23, 2022, 9 pgs.

* cited by examiner

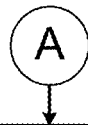

722 — Receive a fourth user input to select a second set of two or more columns from the data set. Perform a second pivot on the second set of two or more columns, resulting in a second new column added to the modified data set. Each data value from the second set of two or more columns is added to the second new column in a respective row in the plurality of new rows.

724 — Selecting the second set of two or more columns comprises detecting a data type for each data value in the second set of two or more columns.

726 — The data type for the second new column is determined in accordance with the detected data types for the data values in the second set of two or more columns.

728 — When the number of columns in the second set of two or more columns is less than the number of columns in the first set of two or more columns, default values are added to the set of one or more new rows in the second new column.

730 — The default values are one of "N/A", 0, NULL, or blank.

Figure 7B

DATA PREPARATION USER INTERFACE WITH COORDINATED PIVOTS

RELATED APPLICATIONS

This application is a continuation of U.S. patent application Ser. No. 16/221,413, filed Dec. 14, 2018, entitled "Data Preparation User Interface with Coordinated Pivots," which is incorporated by reference herein in its entirety.

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, data frequently needs to be manipulated or modified to be put it into a format that can easily be used by data visualization applications.

Many types of data manipulation operations are required for users to prepare their data for analysis, such as pivot operations. However, the pivot operations supported by typical data flow applications do not accomplish all of the tasks that people need for their data.

SUMMARY

Disclosed implementations provide simplicity and clarity to users in terms of preparing data. The disclosed data preparation applications provide profile panes that permit compound pivot operations. This facilitates certain data cleaning and/or curating that may be required for users to take high-level action and appropriately analyze their data. The design of these "coordinated pivots" permits users to perform multiple pivots sequentially on different sets of columns at any point in data analysis, and thus provides increased functionality to users.

In accordance with some implementations, a method prepares data for subsequent analysis. The method is performed at a computer system having a display, one or more processors, and memory storing one or more programs configured for execution by the one or more processors. The method includes displaying a user interface that includes a plurality of panes, including a data flow pane and a profile pane. The data flow pane includes a flow diagram having a plurality of nodes, each node specifying a respective primary operation or specifying one or more secondary operations to clean a respective data set. The method further includes receiving a first user input to select an existing node in the flow diagram. The method further includes receiving a second user input to insert a new node into the flow diagram. The method further includes receiving a third user input to select a first set of two or more columns of data values. The method continues by performing a first pivot on the first set of two or more columns, resulting in a modified data set having a plurality of new rows and a first set of one or more new columns. The method further includes receiving a fourth user input to select a second set of two or more columns of data values. The method continues by performing a second pivot on the second set of two or more columns, resulting in a second new column added to the modified data set. Each data value in the second set of two or more columns is added to the second new data column in a respective row of the plurality of new rows.

In accordance with some implementations, the new node is inserted into the flow diagram at a location after the selected existing node.

In accordance with some implementations, each of the existing nodes has a respective intermediate data set computed according to the specified respective operation and the intermediate data set for the new node is the modified data set.

In accordance with some implementations, the first pivot defines the number of rows in the plurality of new rows (e.g., the number of new rows equals the number of selected columns in the first set of two or more columns).

In accordance with some implementations, selecting the first set of two or more columns includes detecting a data type for each data value in the first set of two or more columns. A respective data type for each new column in the first set of two or more new columns corresponds to the determined data types of the data values in the first set of two or more columns.

In accordance with some implementations, selecting the second set of two or more columns includes detecting a data type for each data value in the second set of two or more columns. A respective data type for the second new column is determined in accordance with the detected data types for the data values in the second set of two or more columns.

In accordance with some implementations, when the number of columns in the second set of two or more columns is less than the number of columns in the first set of two or more columns, default values are added to the set of one or more new rows in the second new column. In some implementations, the default values are 0, NULL, or blank, or displayed as "N/A".

In some implementations, a non-transitory computer-readable storage medium stores one or more programs configured for execution by a computer system having one or more processors, memory, and a display. The one or more programs include instructions for performing any of the methods described herein.

In some implementations, a computer system has one or more processors, memory, and a display. The memory stores one or more programs configured for execution by the one or more processors and include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
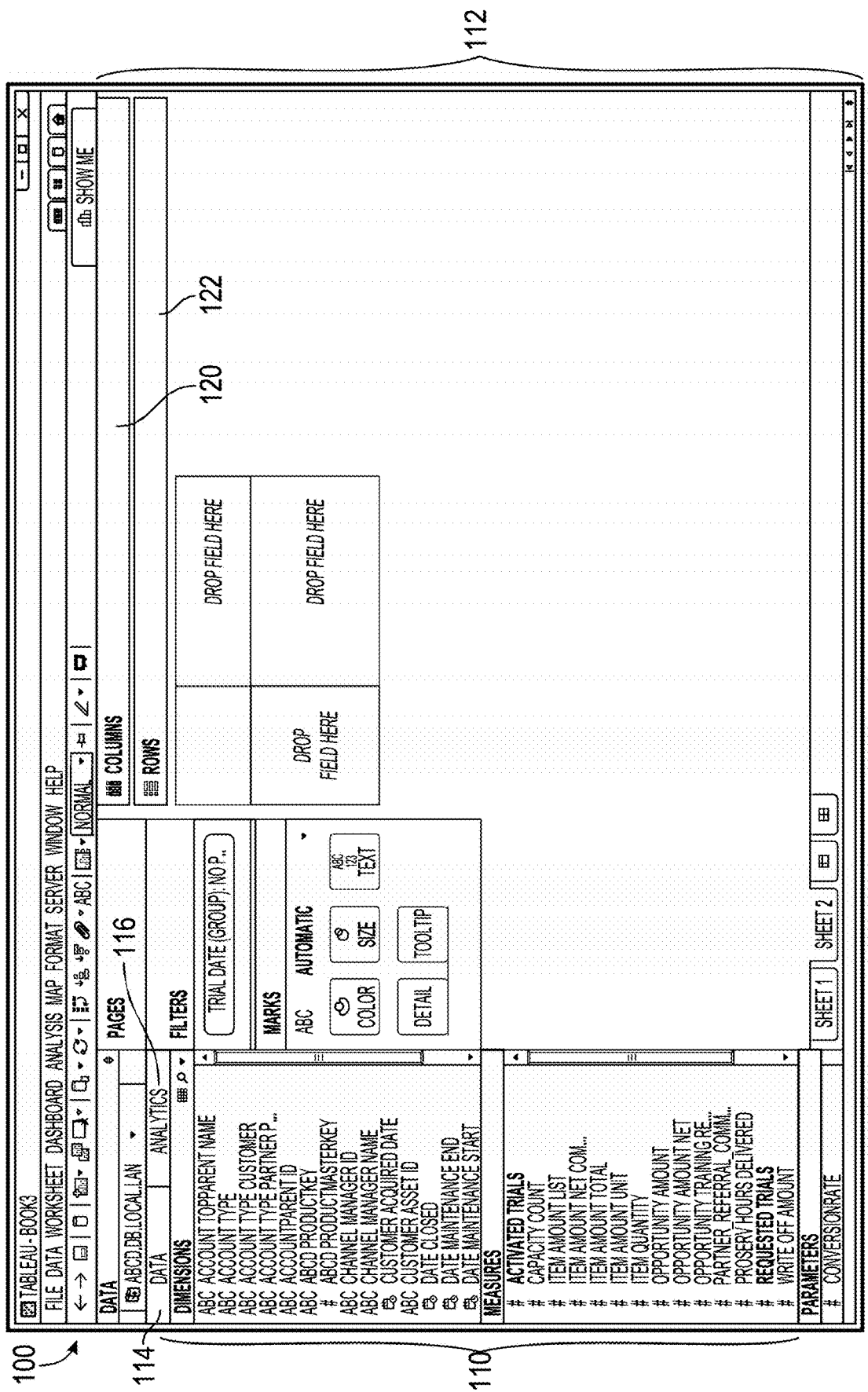
FIG. 1 illustrates a graphical user interface for a data visualization application used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
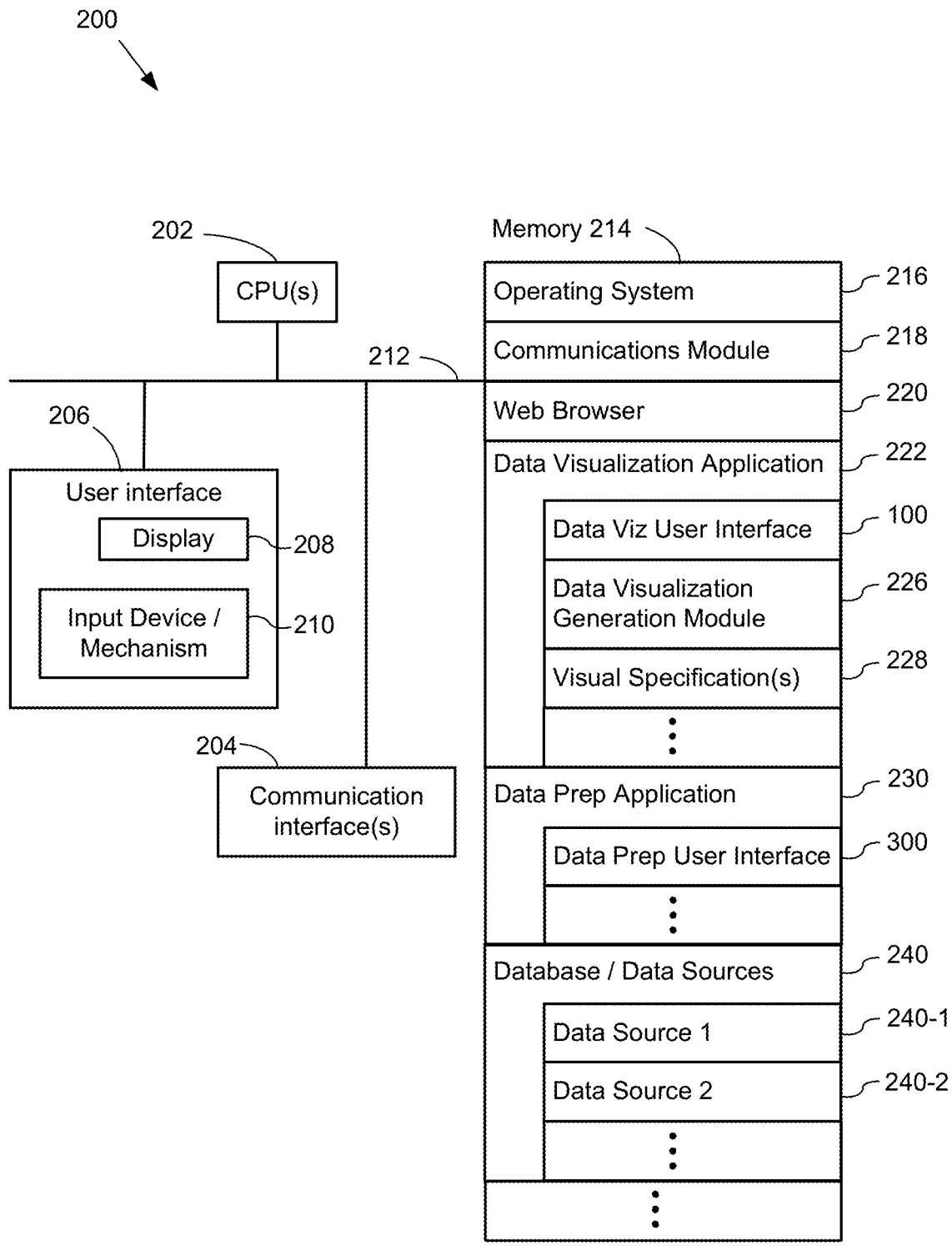
FIG. 2 is a block diagram of a computing device, according to some implementations.

FIG. 2 is a block diagram illustrating a computing device 200 that can display the graphical user interface 100 and/or the graphical user interface 300 in accordance with some implementations. The computing device can also be used by a data preparation ("data prep") application 230. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprise a non-transitory computer-readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222 and/or a data prep application 230. In some implementations, the data sources are stored as spreadsheet files, CSV files, XML files, or flat files, or stored in a relational database.

Figure 3A:
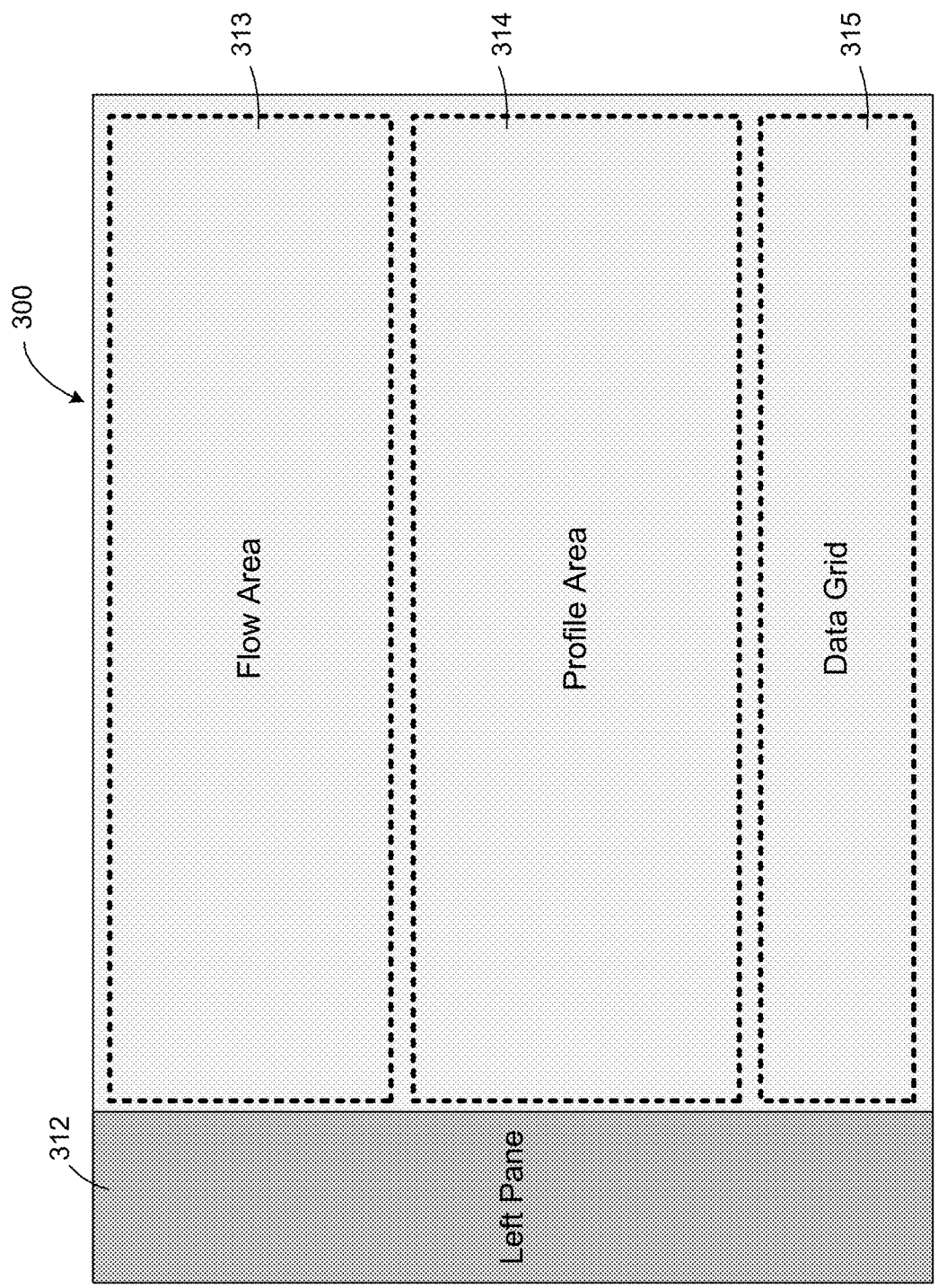
FIGS. 3A and 3B illustrate a graphical user interface for a data preparation application, in accordance with some implementations.
Figure 3B:
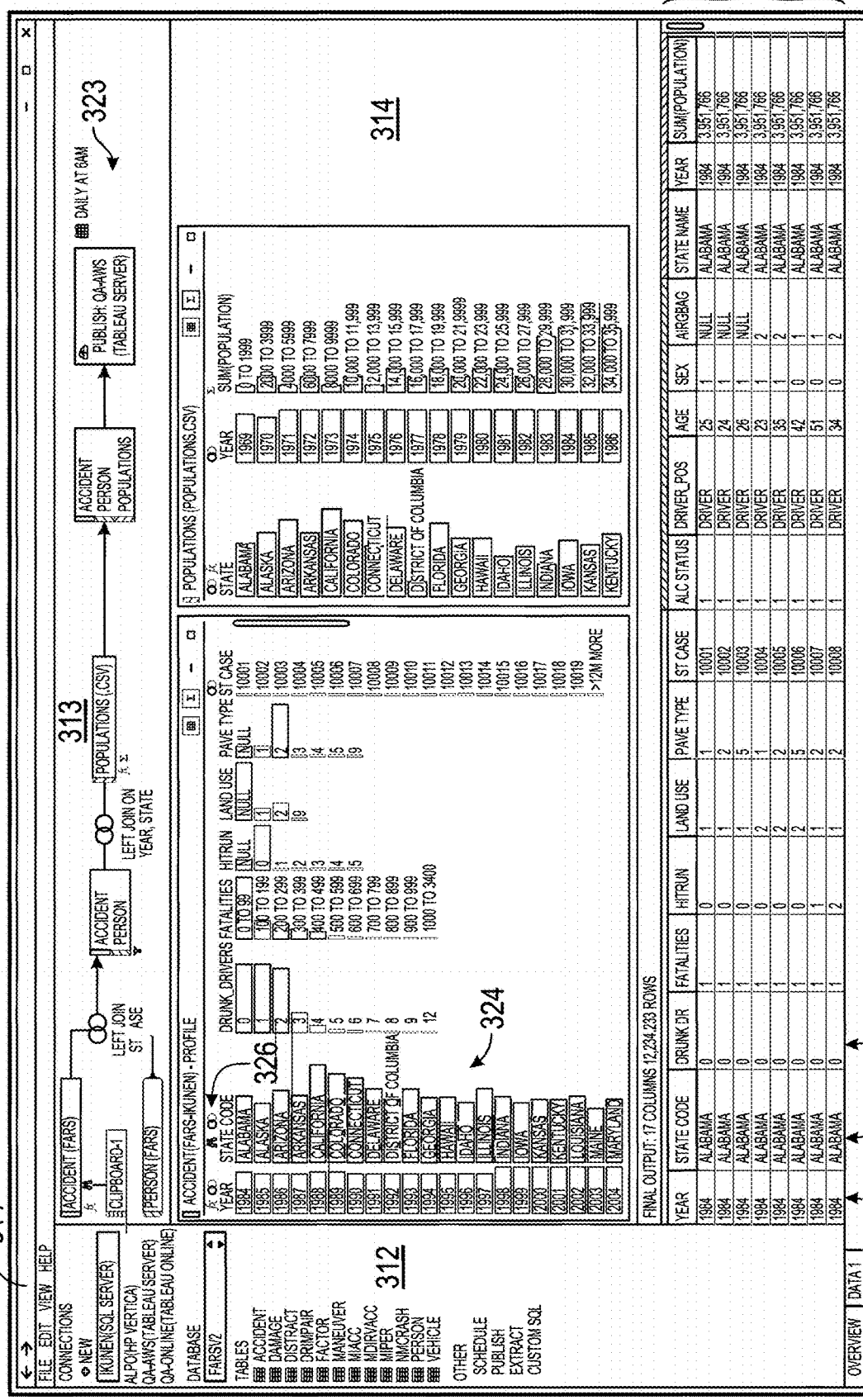

In some implementations, the computing device 200 stores a data prep application 230, which has a user interface 300, as shown in FIGS. 3A and 3B. A user uses the data prep application 230 to analyze and massage data for subsequent analysis (e.g., by a data visualization application 222). The data prep application 230 enables user to build flows 323, as described in more detail below.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIG. 3A illustrates an overview of a user interface 300 for data preparation, showing panes that group together different functionality. In some implementations, the left-hand pane 312 provides options for a user to locate and connect to data or to perform operations on already selected data. In some implementations the flow area 313 illustrates one or more operations at nodes to perform on selected data (e.g., data manipulations to prepare data for analysis). In some implementations the profile area provides information about the data set at the currently selected node. In some implementations, the data grid 315 provides raw data values in rows and columns of the data set at the currently selected node.

FIG. 3B provides a concrete example of a user interface 300 for data preparation, showing the user interface elements in each of the panes. The menu bar 311 includes one or more menus, such as a File menu and an Edit menu. Although the edit menu is available, more changes to the flow are performed by interacting with the flow pane 313, the profile pane 314, or the data pane 315.

In some implementations, the left-hand pane 312 includes a data source palette/selector. The left-hand pane 312 also includes an operations palette, which displays operations that can be placed into the flow. In some implementations, the list of operations includes arbitrary joins (of arbitrary type and with various predicates), union, pivot, rename and restrict column, projection of scalar calculations, filter, aggregation, data type conversion, data parse, coalesce, merge, split, aggregation, value replacement, and sampling. Some implementations also support operators to create sets (e.g., partition the data values for a data field into sets), binning (e.g., grouping numeric data values for a data field into a set of ranges), and table calculations (e.g., calculate data values, such as percent of total, for each row, which depends not only on the data values in each row, but also on other data values in the table).

The left-hand pane 312 also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 313 displays a visual representation (e.g., node/link flow diagram) 323 for the current flow. The Flow Pane 313 provides an overview of the flow, which serves to document the process. As the number of nodes increases, implementations typically add scroll boxes. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 313 shows just the nodes within the super node, and the flow pane 313 has a heading that identifies what portion of the flow is being displayed. Implementations typically enable multiple hierarchical levels.

A complex flow is likely to include several levels of node nesting. Different nodes within the flow diagram 323 perform different tasks, and thus the node internal information is different. In addition, some implementations display different information depending on whether or not a node is selected. A flow diagram 323 provides an easy, visual way to understand how the data is getting processed, and keeps the process organized in a way that is logical to a user.

As described above, the profile pane 314 includes schema information about the data set at the currently selected node (or nodes) in the flow pane 313. As illustrated here, the schema information provides statistical information about the data, such as a histogram 324 of the data distribution for each of the fields. A user can interact directly with the profile pane to modify the flow 323 (e.g., by selecting a data field for filtering the rows of data based on values of that data field). The profile pane 314 also provides users with relevant data about the currently selected node (or nodes) and visualizations that guide a user's work. For example, the histograms 324 show the distributions of the domains of each column. Some implementations use brushing to show how these domains interact with each other.

The data pane 315 displays the rows 325 of data corresponding to the selected node or nodes in the flow pane 313. Each of the columns 326 corresponds to one of the data fields. A user can interact directly with the data in the data pane to modify the flow 323 in the flow pane 313. A user can also interact directly with the data pane to modify individual field values. In some implementations, when a user makes a change to one field value, the user interface applies the same change to all other values in the same column whose values (or pattern) match the value that the user just changed.

The sampling of data in the data pane 315 is selected to provide valuable information to the user. For example, some implementations select rows that display the full range of values for a data field (including outliers). As another example, when a user has selected nodes that have two or more tables of data, some implementations select rows to assist in joining the two tables. The rows displayed in the data pane 315 are selected to display both rows that match between the two tables as well as rows that do not match. This can be helpful in determining which fields to use for joining and/or to determine what type of join to use (e.g., inner, left outer, right outer, or full outer).

Although a user can edit a flow diagram 323 directly in the flow pane 313, changes to the operations are typically done in a more immediate fashion, operating directly on the data or schema in the profile pane 314 or the data pane 315 (e.g., right clicking on the statistics for a data field in the profile pane to add or remove a column from the flow).

Figure 4A:
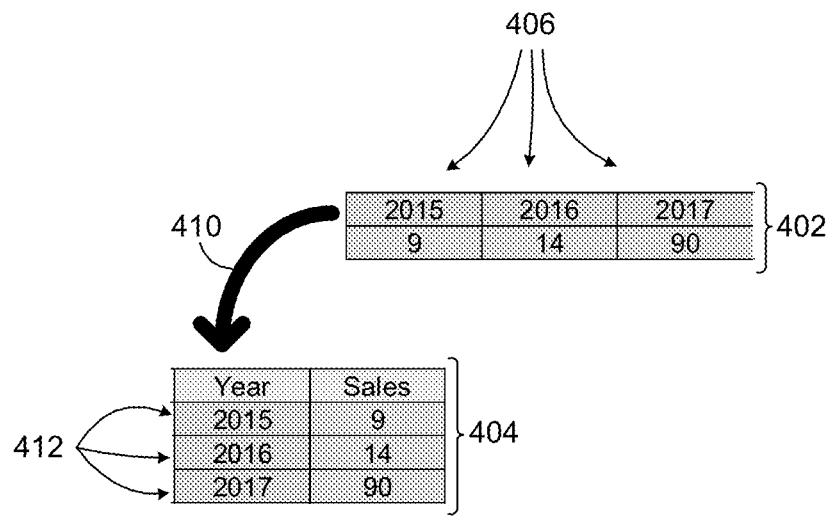
FIGS. 4A and 4B illustrates pivot operations, in accordance with some implementations FIGS. 5A, 5B, and 5C collectively illustrate the addition of a pivot node to a data flow pane, in accordance with some implementations.

FIG. 4A illustrates a single pivot operation, where a first data structure 402 is converted into a second data structure 404 of a different shape. In the example implementation, a single set of columns 406 is selected by the user, and each column is converted into a row by a pivot operation 410 (e.g., three columns are selected initially, and three rows 412 result).

Figure 4B:
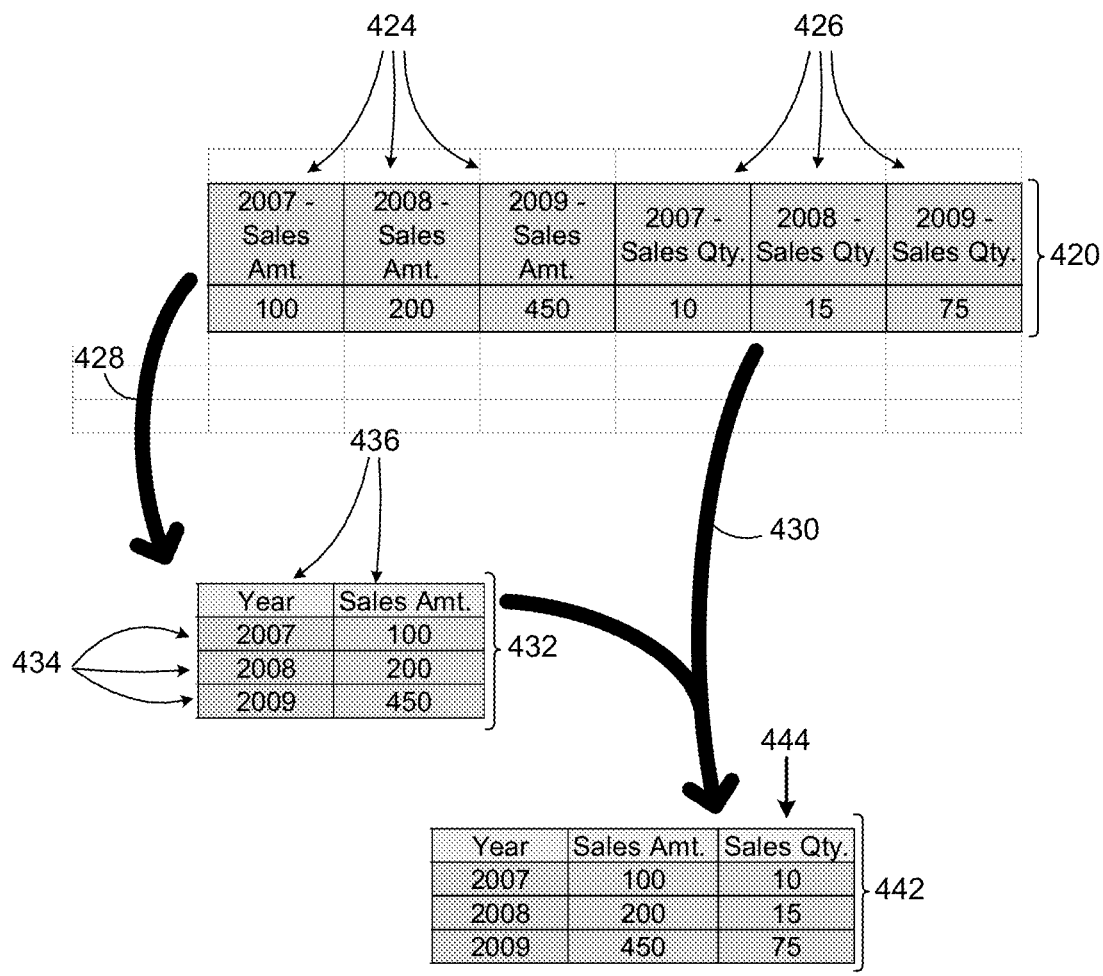

In some implementations, a first pivot operation 428 may be followed by a second pivot operation (e.g., where a second set of columns are selected after the first pivot operation 428 is completed and the second set of columns is then pivoted). This is shown in FIG. 4B, where there are two sets 424 and 426 of two or more columns. These two sets 424 and 426 of columns are converted via a first pivot operation 428 into a second data structure 432, and then converted via a second coordinated pivot operation 430 from the second data structure 432 into a third data structure 442 of a different shape.

A coordinated pivot begins with a user selection a first set 424 of two or more columns. The first set 424 of columns is pivoted (428) to produce a new set of two or more rows 434 and a new set 436 of two or more columns. Then a second set 426 of two or more columns is selected by the user. This second set 426 of columns is then pivoted (430) in accordance with the data structure 432 produced by the first pivot 428, resulting in a new column 444. In particular, the data values in the second set 426 of columns are added to the new column 444 in the new set of rows 434. FIG. 4B illustrates the underlying effect on a data structure, but the user interface shown in FIGS. 3A and 3B provides multiple methods for a user to select different sets of columns, as further illustrated by FIGS. 5A-5C and 6A-6I.

Figure 5A:
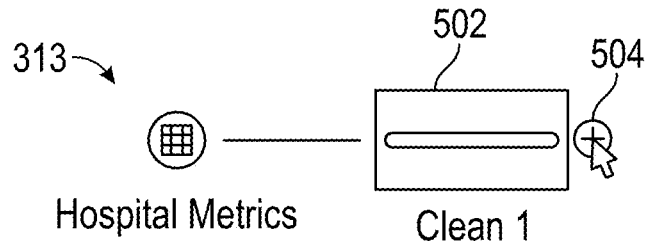
Figure 5B:
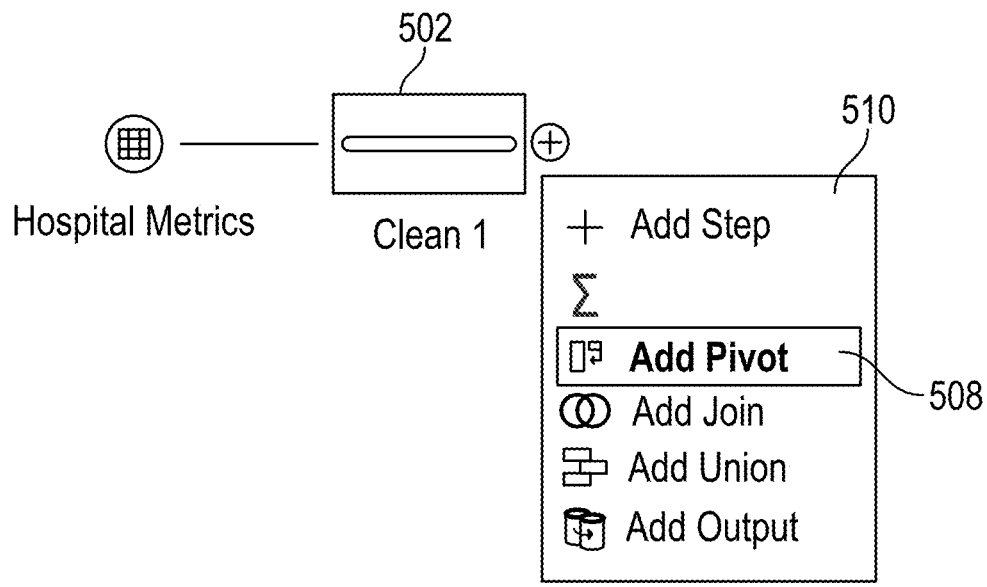
Figure 5C:
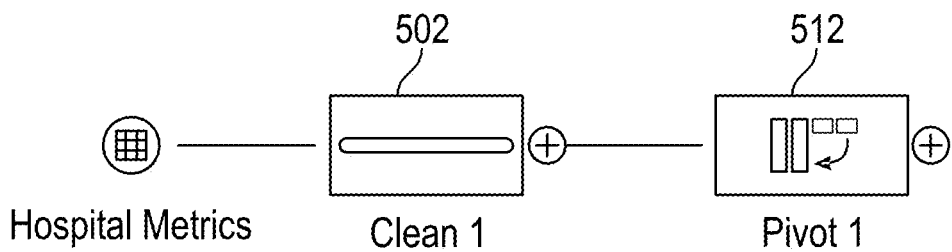

FIGS. 5A, 5B, and 5C illustrate how a user may add a new pivot node, preparatory to performing a coordinated pivot operation, into a data flow 313. In FIG. 5A, a user input has selected an existing node 502 in the data flow 313. In this example, a user is performing cleaning operations on the data set of an existing node 502 (e.g., "Clean 1"). The user selects the context menu affordance 504 to access a context menu 510. The context menu provides a plurality of operation options to the user, including "Add Step," "Add Aggregate," and "Add Pivot" 508. If the user selects "Add Pivot" 508, a new pivot node 512 is added to the data flow 313. Similarly, if a different operation option is selected by the user, a different type of node is added to the data flow pane 313.

Figure 6A:
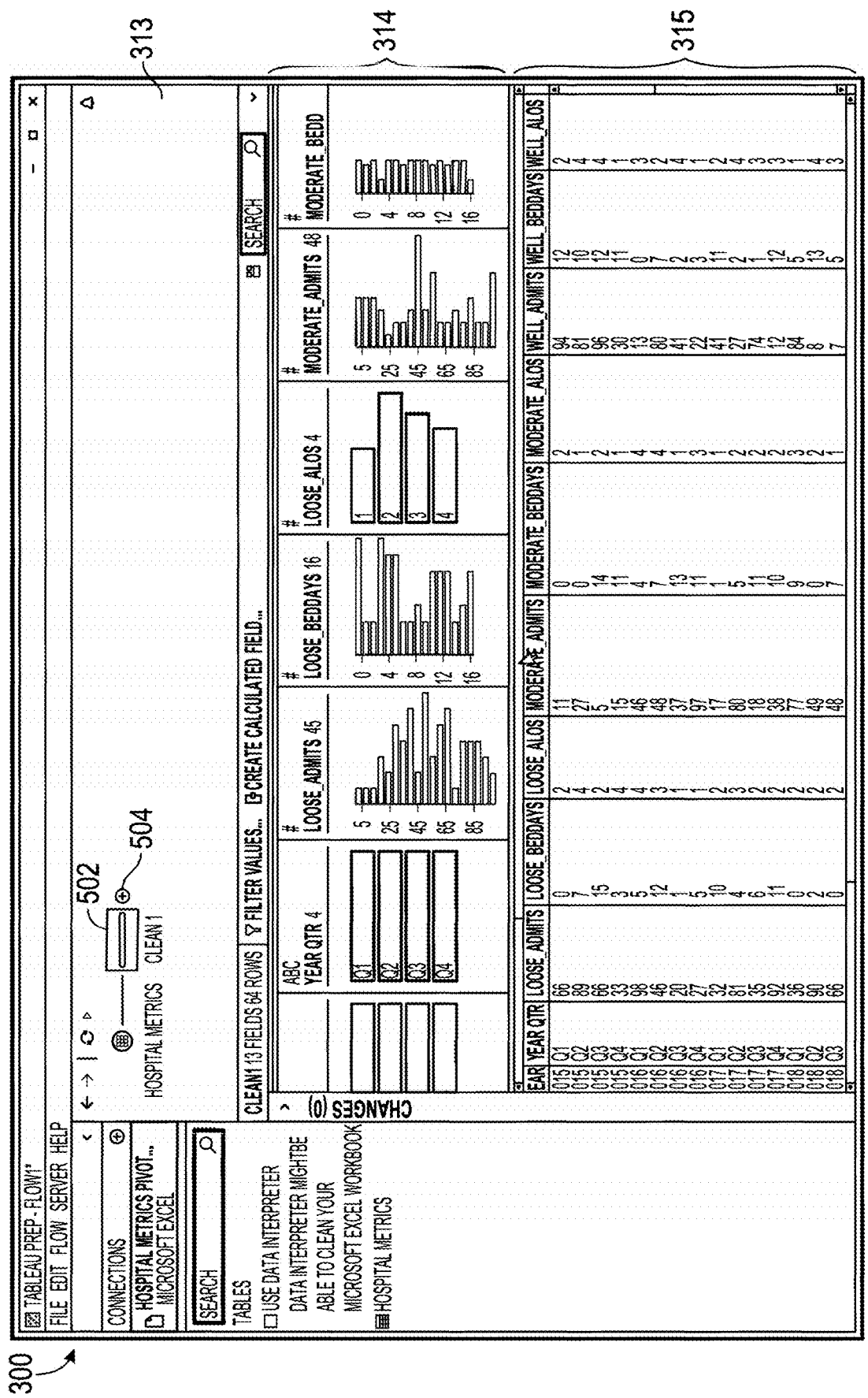
FIGS. 6A-6I collectively illustrate a data flow where coordinated pivots have been performed, in accordance with some implementations FIGS. 7A and 7B provide a flowchart for a method of enabling users to perform coordinated pivots, in accordance with some implementations.

FIG. 6A illustrates an example user interface 602, with a flow pane 313, a profile pane 314, and a data pane 315. In some implementations, one or more existing nodes (e.g., 502) are present in the flow pane 313. When an existing node is selected, in some implementations, a plurality of data values associated with the selected node are displayed in the data pane 315. In some implementations, when a user adds a new node (e.g., as described above in reference to FIGS. 5A, 5B, and 5C) a new intermediate data set is computed, or initialized as a copy of the data set of the previously selected node.

Figure 6B:
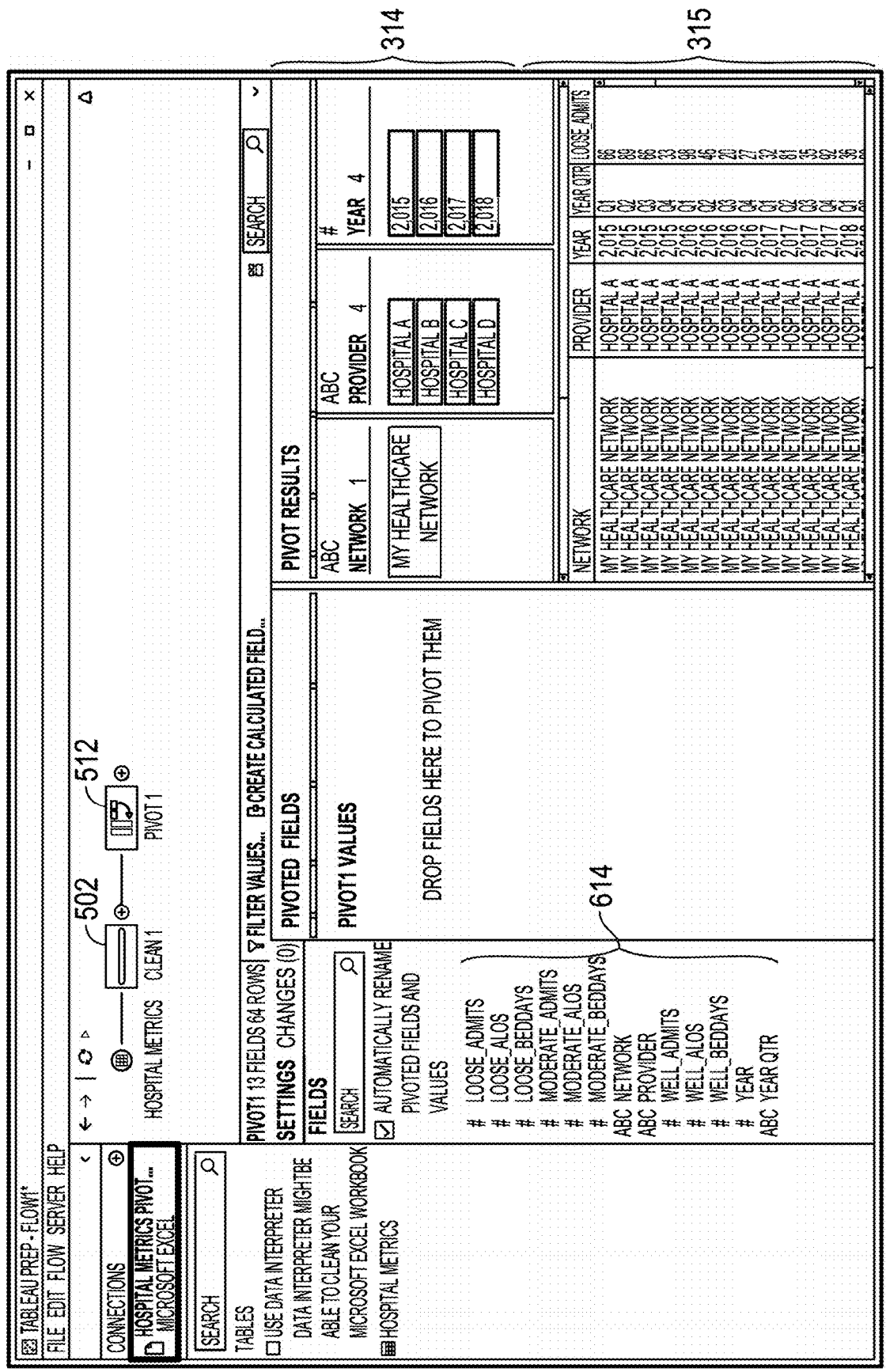

When a user input is received to insert a new node (e.g., by selecting context menu affordance 510), a new node 512 is inserted, as illustrated by FIG. 6B. In some implementations, the profile and data panes are reorganized, and one or more new panes (e.g., 610 and 612) are displayed, enabling users to manage and coordinate multiple pivots. In some implementations, the left pane 610 displays all or a subset of the columns 614 associated with the data set in the data pane 315 (i.e., the data set associated with the previously selected node 502). In some implementations, only a subset of columns is available for pivoting. The Pivoted Fields pane 612 displays columns that a user has chosen to pivot, as discussed below.

In some implementations, a new node does not need to be inserted for a coordinated pivot operation to be performed. In some implementations, instead of inserting a new node, the coordinated pivot is added as an additional operation to an existing node.

Figure 6C:
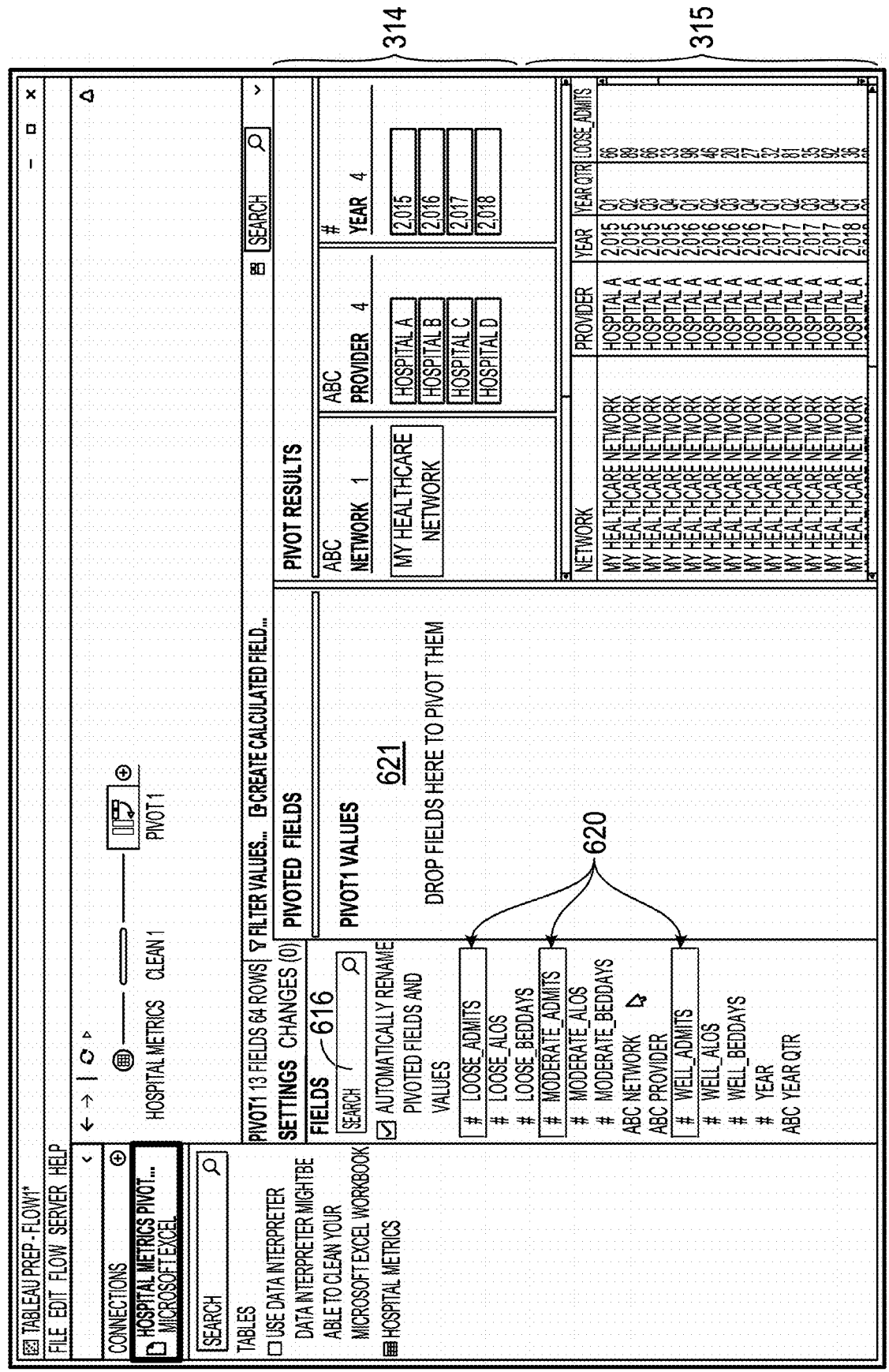
Figure 6D:
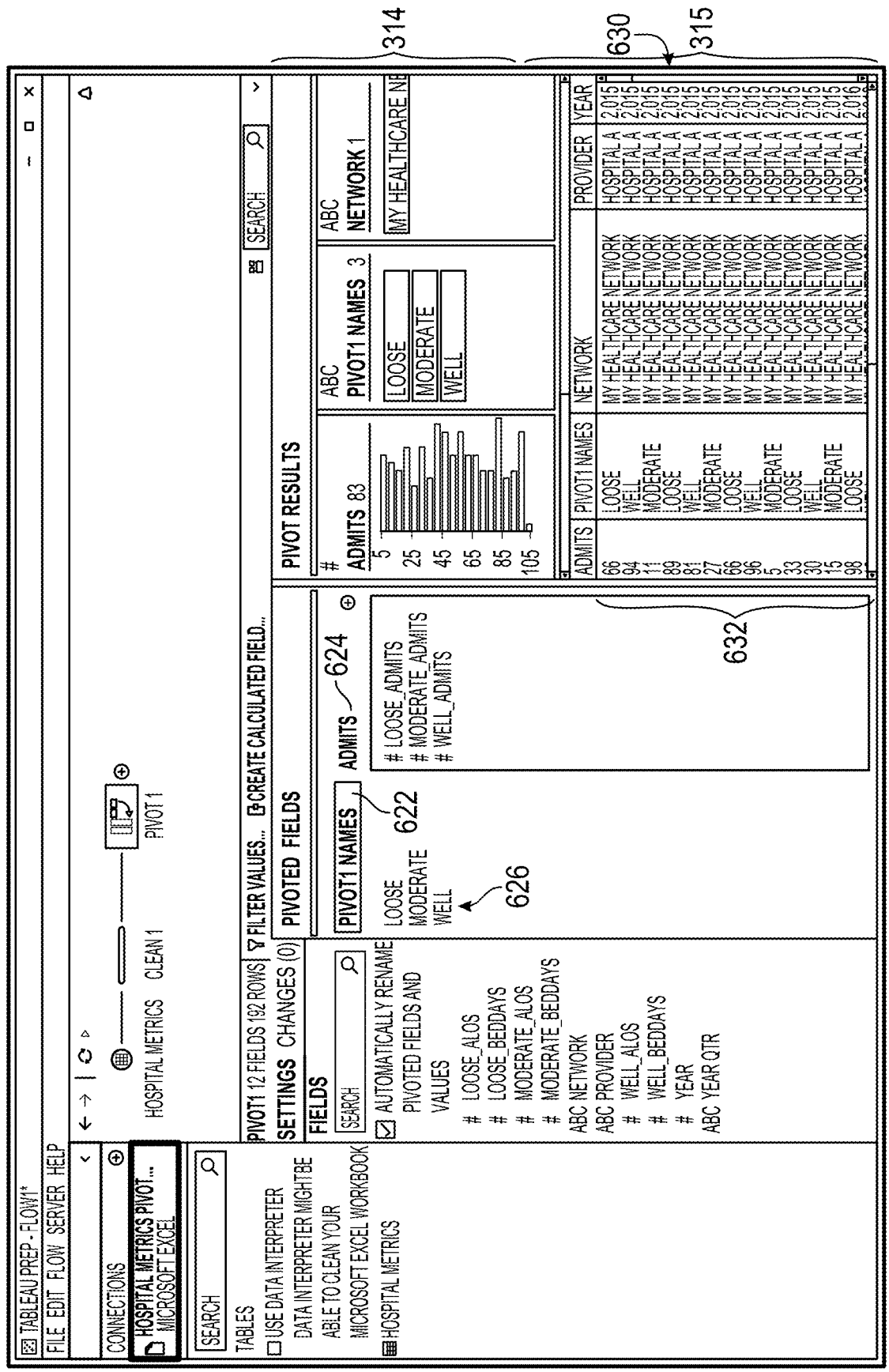

As illustrated in FIG. 6C, a user may select a set of two or more columns 620 from the left pane 610 for pivoting. In some implementations, a user may search for columns that contain a string by entering text into search bar 616. Once a user has selected a first set of columns 620, a user may drag the first set of selected columns to the "Pivot1 Values" section 621 of the Pivoted Fields pane 612. FIG. 6D illustrates columns 624 that have been pivoted in the Pivoted Fields pane 612. Once the first selected columns 620 have been pivoted, at least one new column 624 and a plurality of new rows 626 are displayed in the Pivoted Fields pane. The remaining columns (e.g., those that remain unpivoted) are displayed in the left pan 610. After the first pivot, the data fields 630 in the first set of selected pivoted data set are displayed in a new configuration in data pane 315 and profile pane 314 (e.g., the data in the new set of rows 632 is displayed). In some implementations, a user may rename 622 the set of new rows 626. In some implementations, names 626 for each row in the new set of rows may be automatically generated from common values in the headers of the first set of collected columns. In some implementations, a user may select an option to automatically rename pivoted fields and values. In cases where no common values are present, one or more default names are assigned. In some implementations, a user may designate names 626 for or rename each row in the new set of rows.

Figure 6E:
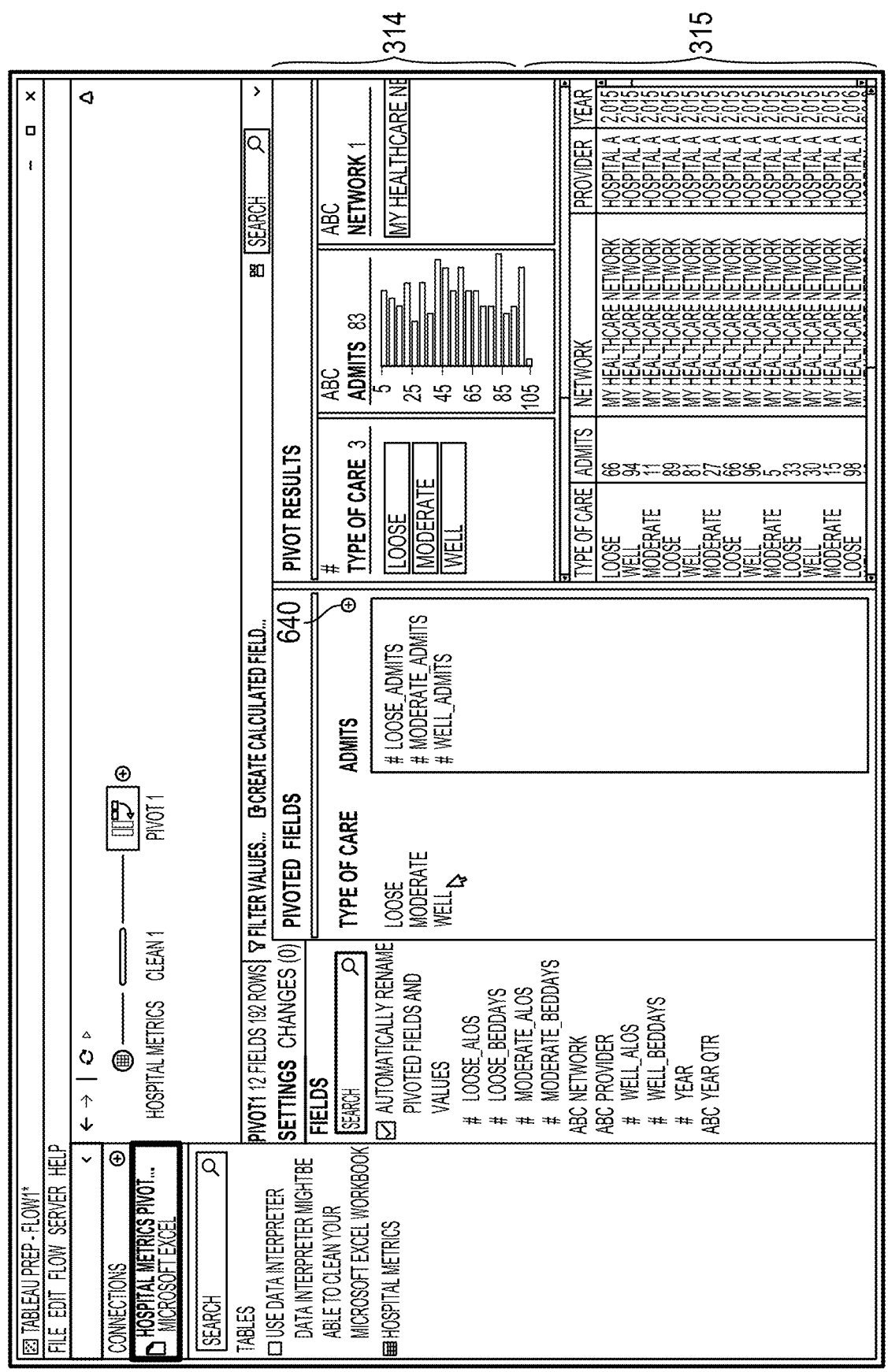
Figure 6F:
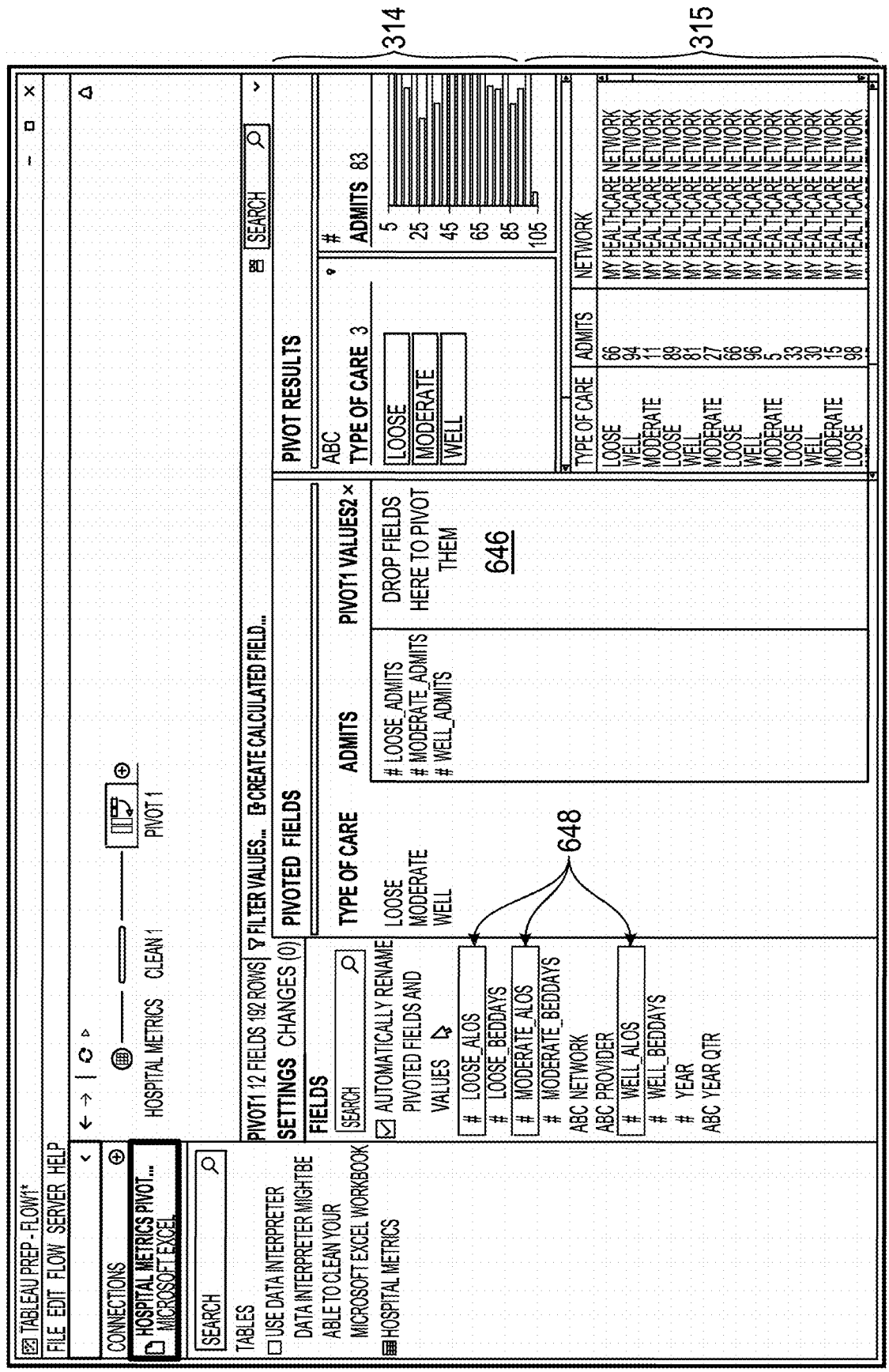
Figure 6G:
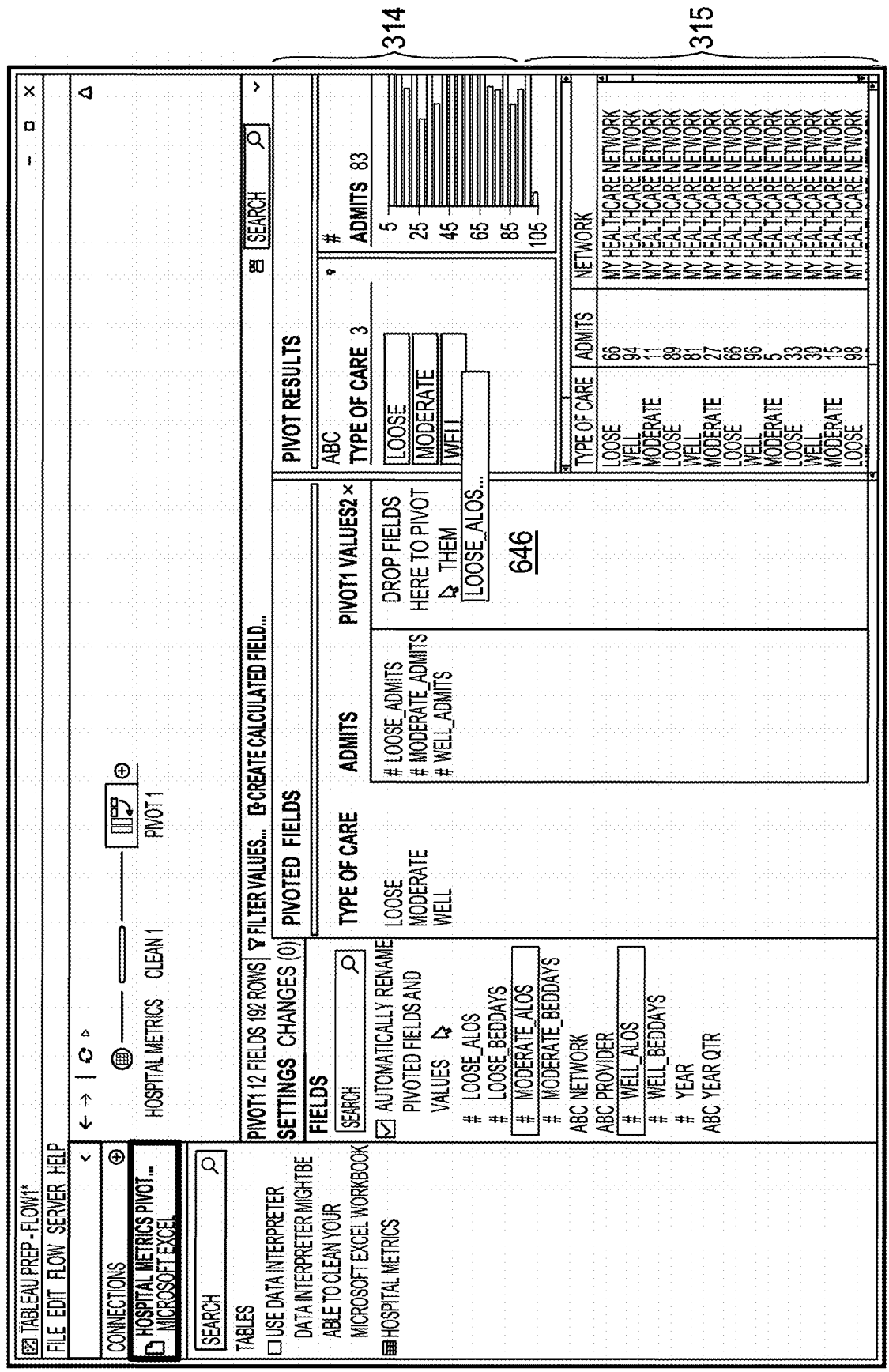
Figure 6H:
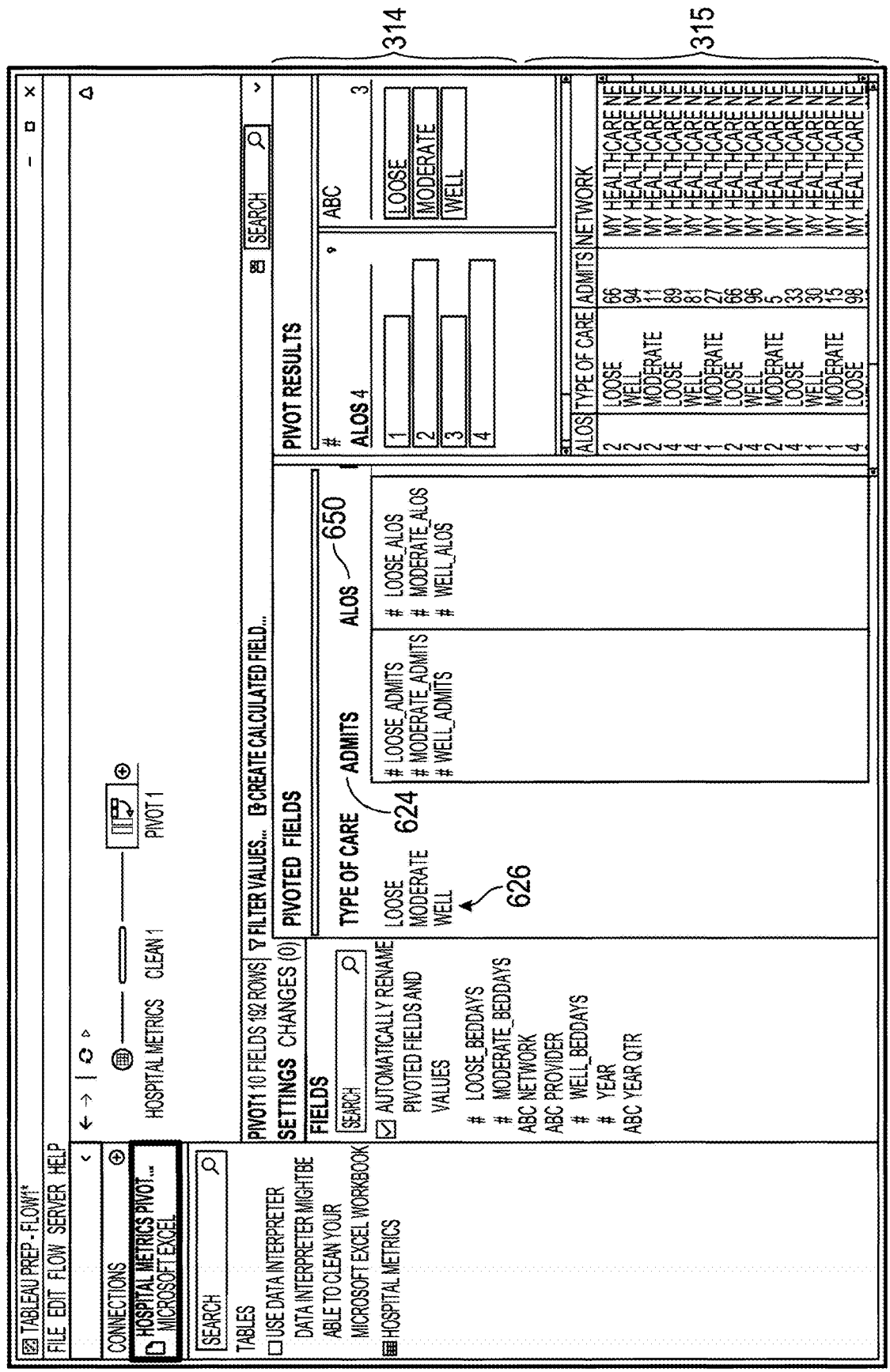

To pivot another set of columns in accordance with the first set of pivoted columns 620, a user selects an add pivot affordance 640, as illustrated in FIG. 6E. This adds an additional panel 646 (e.g., "Pivot1 Values2") to the Pivoted Fields pane 612. The additional panel 646 is shown in FIG. 6F. A user selects a second set of columns 648 to be pivoted. After selecting the second set of columns, the user drags the columns 648 from the left pane 610 to the second pivot panel 646. The second set of columns are then pivoted, as denoted by the "ALOS" column 650 in the second pivot panel 646. Each data value from the second set of columns 648 is added to one of the new set of rows 626 produced from the first pivot, in a new column.

In some implementations, the second set of columns must has the same number of columns as the number of columns in the first set of selected columns. In other implementations, a user may select a different number of columns for the second set of columns. In this case, when the number of columns in the second set of two or more columns is less than the number of columns in the first set of two or more columns, one or more default values are added to the set of one or more new rows associated with the second new column. In some implementations, the default values are "N/A," 0, NULL or blank.

Figure 6I:
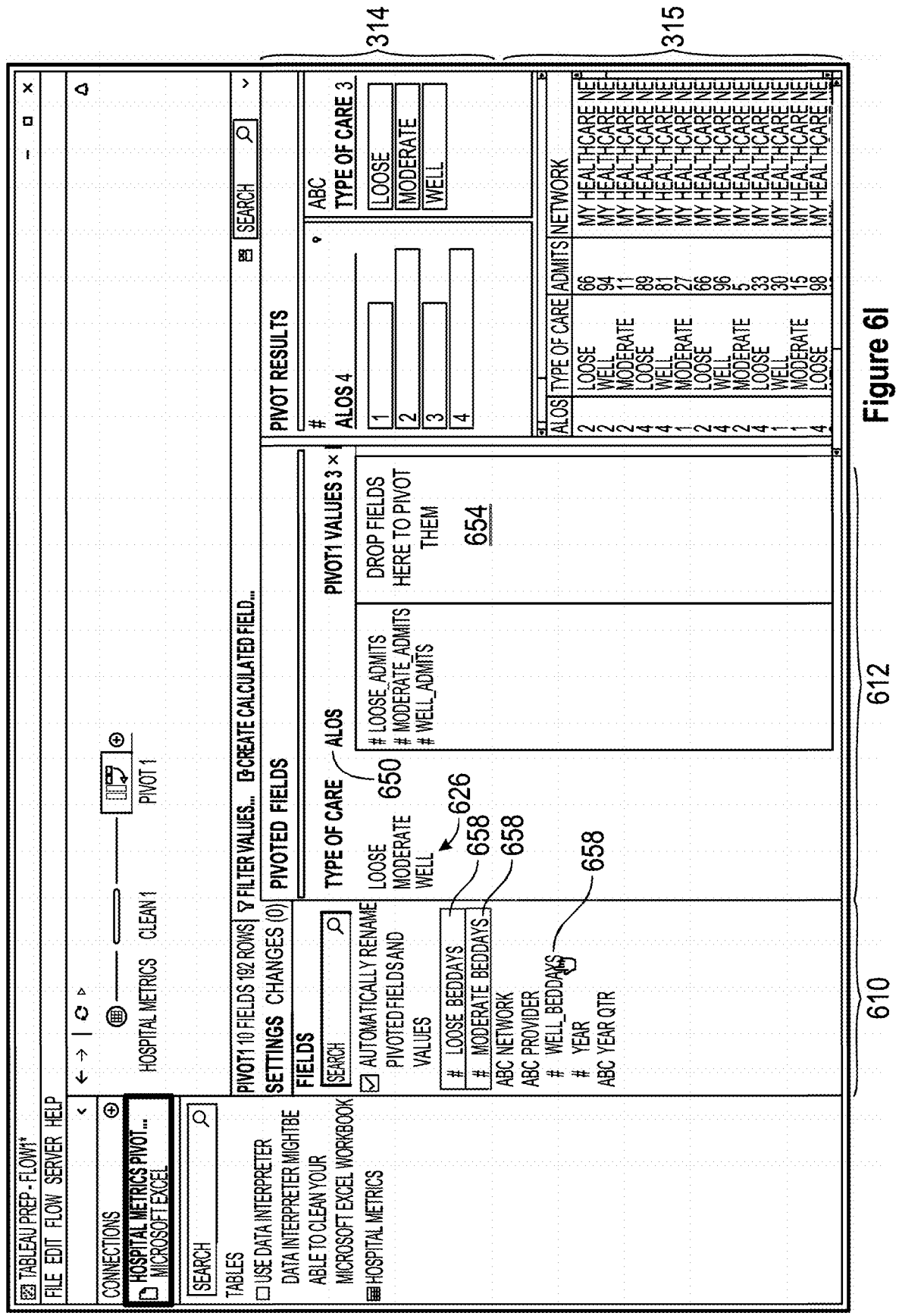
Figure 7A:
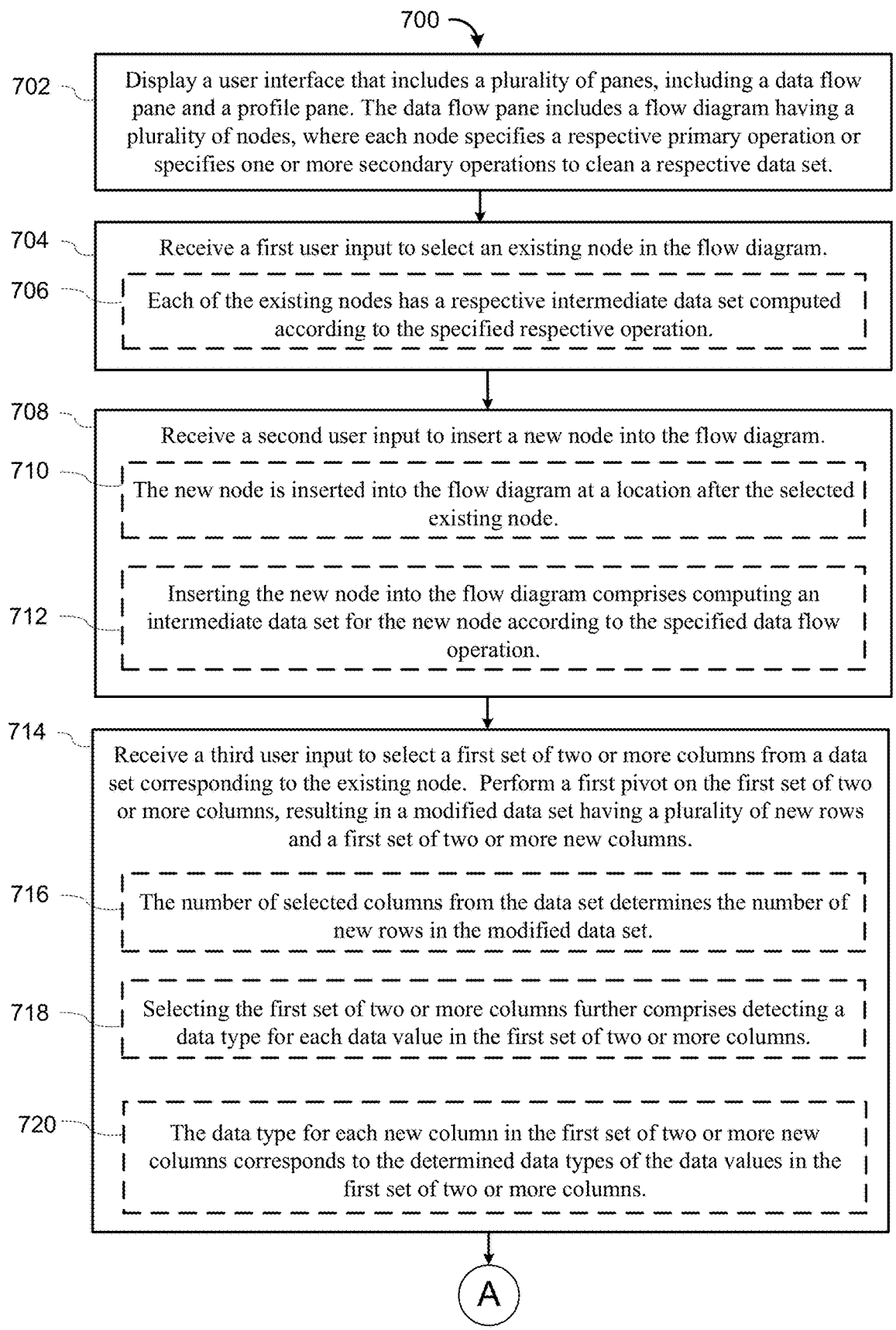

In some implementations as illustrated by FIG. 6I, a new panel 654 is added and another set of at least one column 658 is selected by the user to perform another coordinated pivot operation. The method can be repeated as long as FIGS. 7A and 7B provide a flowchart 700 of a process of using an interactive method to dynamically prepare a data set in accordance with some implementations. The method is typically performed at a computer 200 having a display 208, one or more processors 202, and memory 214 storing one or more programs configured for execution by the one or more processors.

The method 700 displays (702) a user interface 300, which includes a plurality of panes, including a data flow pane 313 and a profile pane 314. The data flow pane includes (702) a flow diagram having a plurality of nodes (e.g., the nodes 502 and 512 in FIG. 5C). Each node specifies (702) a respective primary operation or specifies one or more secondary operations to clean a respective data set.

The method receives (704) a first user input to select an existing node from the flow diagram (e.g., the selected node 502 in FIG. 6A). In some implementations, each of the existing nodes in the flow pane 313 has (706) a respective intermediate data set computed according to the specified respective operation or operations.

The method receives (708) a second user input to insert a new node into the flow diagram. In some implementations, the new node is inserted (710) into the flow diagram at a location after the selected existing node (e.g., immediately after). In some implementations, inserting the new node into the flow diagram comprises (712) computing an intermediate data set for the new node according to the specified data flow operation. In some implementations, no new node is inserted into the flow diagram, and instead an additional operation is added to an existing node (i.e., the selected node) in the flow diagram.

The method receives (714) a third user input to select a first set of two or more columns from a data set corresponding to the existing node, as illustrated by the columns 424 in FIG. 4B. In response to receiving the third user input, the method performs (714) a first pivot operation on the first set of two or more columns, resulting in a modified data set having a plurality of new rows (e.g., the rows 434 in FIG. 4B) and a first set of two or more new columns (e.g., the new columns 436 in FIG. 4B). In some implementations, the number of selected columns in the first set of two or more columns is the number of new rows in the first set of new rows.

In some implementations, selecting a first set of two or more columns further comprises detecting (718) a data type for each data value in the first set of two or more columns. In some implementations, the data type for each new column in the first set of one or more new columns corresponds (720) to the determined data types of the data values in the first set of two or more columns.

In some implementations, the data type for each column in the first set of one or more new columns is selected in accordance with a predetermined data type hierarchy. In some implementations, a predetermined data type hierarchy is defined to preserve the maximum amount of information for each data value. For example, according to one data type hierarchy, if the data values include both floating-point numbers and integers, all of the data values can be converted to floating point numbers. Type coercion can also be applied when non-numeric data values (e.g., having a "string" data type) store data that can be converted to numeric data values.

The method receives (722) a fourth user input to select a second set of two or more columns, such as the columns 426 in FIG. 4B. A second pivot operation is performed (722) on the second set of two or more columns, resulting in a second new column, such as the new column 444 in FIG. 4B. The second new column is added to the first set of one or more new columns. Each data value in the second set of two or more columns is added to the second new column in a respective row of the plurality of new rows.

In some implementations, selecting the second set of two or more columns comprises detecting (724) a data type for each data value in the second set of two or more columns. In some implementations, the data type for the second new column is determined (726) in accordance with the data types for the data values in the second set of two or more columns.

In some implementations, one or more data values in the second new column are coerced to a specific data type in accordance with the data type selected for the second new column.

When the number of columns in the second set of two or more columns is less than the number of columns in the first set of two or more columns, one or more default values are added (728) to the set of one or more new rows in the second new column. In some implementations, the default values are (730) one of "N/A", 0, NULL, or blank.

The disclosed data prep systems 230 give control to users. In many cases, the data prep application 230 makes intelligent choices for the user, but the user is always able to assert control. Control often has two different facets: control over the logical ordering of operations, which is used to ensure the results are correct and match the user's desired semantics; and physical control, which is mostly used to ensure performance.

The disclosed data prep applications 230 also provide freedom. Users can assemble and reassemble their data production components however they wish in order to achieve the shape of data they need.

The disclosed data prep applications 230 provide incremental interaction and immediate feedback. When a user takes actions, the system provides feedback through immediate results on samples of the user's data, as well as through visual feedback.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating coordinated pivot tables, comprising:
at a computer system having one or more processors and memory storing one or more programs configured for execution by the one or more processors:
displaying, in a user interface, a plurality of data field icons, each of the plurality of data field icons corresponding to a respective data field of a data source;
receiving a first user input in the user interface to select a first set of two or more data field icons from the plurality of data field icons;
in response to receiving the first user input, performing a first pivot on a first set of two or more data fields, corresponding to the first set of two or more data field icons, to form a data table having (i) a plurality of new rows that are created by converting data columns of the first set of two or more data fields into the plurality of new rows and (ii) a first set of two or more new columns, and displaying the data table in the user interface;
receiving a second user input in the user interface to select a second set of two or more data field icons from the plurality of data field icons, wherein the second set of data field icons is distinct from the first set of data field icons; and
in response to receiving the second user input:
performing a second pivot on a second set of two or more data fields, corresponding to the second set of two or more data field icons, to form a second new column;
adding the second new column to the data table formed by the first pivot, each data value from the second set of two or more data fields added to the second new column in a respective row of the plurality of new rows (1) without creating additional new rows and (2) without modifying existing data values in the first set of two or more columns formed by the first pivot; and
redisplaying the data table in the user interface.

2. The method of claim 1, wherein each of the plurality of new rows of the data table formed by the first pivot corresponds to a unique column of the first set of two or more data fields.

3. The method of claim 1, wherein:
selecting the first set of two or more data field icons further comprises detecting a respective data type for each data value in the first set of two or more data fields corresponding to the first set of two or more data field icons.

4. The method of claim 3, wherein a respective data type for each new column in the first set of two or more new columns corresponds to the detected data types for the data values in the first set of two or more data fields corresponding to the first set of two or more data field icons.

5. The method of claim 3, wherein:
selecting the second set of two or more data field icons further comprises detecting a respective data type for each data value in the second set of two or more data fields corresponding to the second set of two or more data field icons.

6. The method of claim 5, wherein a respective data type for the second new column is determined in accordance with the detected data types for the data values in the second set of two or more data fields corresponding to the second set of two or more data field icons.

7. The method of claim 1, wherein, when a number of columns in the second set of two or more data fields is less than a number of columns in the first set of two or more data fields, default values are added to one or more new rows in the second new column.

8. The method of claim 7, wherein the default values are one of "N/A," 0, NULL, or blank.

9. A computer system for generating coordinated pivot tables, comprising:
one or more processors;
memory; and
one or more programs stored in the memory and configured for execution by the one or more processors, the one or more programs comprising instructions for:
displaying, in a user interface, a plurality of data field icons, each of the plurality of data field icons corresponding to a respective data field of a data source;
receiving a first user input in the user interface to select a first set of two or more data field icons from the plurality of data field icons;
in response to receiving the first user input, performing a first pivot on a first set of two or more data fields, corresponding to the first set of two or more data field icons, to form a data table having (i) a plurality of new rows that are created by converting data columns of the first set of two or more data fields into the plurality of new rows and (ii) a first set of two or more new columns, and displaying the data table in the user interface;
receiving a second user input in the user interface to select a second set of two or more data field icons from the plurality of data field icons, wherein the second set of data field icons is distinct from the first set of data field icons; and
in response to receiving the second user input:
performing a second pivot on a second set of two or more data fields, corresponding to the second set of two or more data field icons, to form a second new column;
adding the second new column to the data table formed by the first pivot, each data value from the second set of two or more data fields added to the second new column in a respective row of the plurality of new rows (1) without creating additional new rows and (2) without modifying existing data values in the first set of two or more columns formed by the first pivot; and
redisplaying the data table in the user interface.

10. The computer system of claim 9, wherein each of the plurality of new rows corresponds to a unique column of the first set of two or more data fields.

11. The computer system of claim 9, wherein the instructions for receiving the first user input in the user interface to select the first set of two or more data field icons further comprises instructions for detecting a respective data type for each data value in the first set of two or more data fields corresponding to the first set of two or more data field icons.

12. The computer system of claim 11, wherein a respective data type for each new column in the first set of two or more new columns corresponds to the detected data types for the data values in the first set of two or more data fields corresponding to the first set of two or more data field icons.

13. The computer system of claim 11, wherein the instructions for receiving a second user input in the user interface to select the second set of two or more data field icons further comprises instructions for detecting a respective data type for each data value in the second set of two or more data fields corresponding to the second set of two or more data field icons.

14. The computer system of claim 13, wherein a respective data type for the second new column is determined in accordance with the detected data types for the data values in the second set of two or more data fields corresponding to the second set of two or more data field icons.

15. The computer system of claim 9, wherein, when a number of columns in the second set of two or more data fields is less than a number of columns in the first set of two or more data fields, default values are added to one or more new rows in the second new column.

16. The computer system of claim 15, wherein the default values are one of "N/A," 0, NULL, or blank.

17. A non-transitory computer-readable storage medium storing one or more programs configured for execution by a computer system having one or more processors, memory, and a display, the one or more programs comprising instructions for:

displaying, in a user interface, a plurality of data field icons, each of the plurality of data field icons corresponding to a respective data field of a data source;

receiving a first user input in the user interface to select a first set of two or more data field icons from the plurality of data field icons;

in response to receiving the first user input, performing a first pivot on a first set of two or more data fields, corresponding to the first set of two or more data field icons, to form a data table having (i) a plurality of new rows that are created by converting data columns of the first set of two or more data fields into the plurality of new rows and (ii) a first set of two or more new columns, and displaying the data table in the user interface;

receiving a second user input in the user interface to select a second set of two or more data field icons from the plurality of data field icons, wherein the second set of data field icons is distinct from the first set of data field icons; and in response to receiving the second user input:
performing a second pivot on a second set of two or more data fields, corresponding to the second set of two or more data field icons, to form a second new column;
adding the second new column to the data table formed by the first pivot, each data value from the second set of two or more data fields added to the second new column in a respective row of the plurality of new rows (1) without creating additional new rows and (2) without modifying existing data values in the first set of two or more columns formed by the first pivot; and
redisplaying the data table in the user interface.

18. The non-transitory computer-readable storage medium of claim 17, wherein each of the plurality of new rows corresponds to a unique column of the first set of two or more data fields.

19. The non-transitory computer-readable storage medium of claim 17, wherein the instructions for receiving the first user input in the user interface to select the first set of two or more data field icons further comprises instructions for detecting a respective data type for each data value in the first set of two or more data fields corresponding to the first set of two or more data field icons.

20. The non-transitory computer-readable storage medium of claim 19, wherein a respective data type for each new column in the first set of two or more new columns corresponds to the detected data types for the data values in the first set of two or more data fields corresponding to the first set of two or more data field icons.

* * * * *